Sept. 8, 1953 G. J. JOHANEK ET AL 2,651,711
CENTRALIZED TRAFFIC CONTROLLING SYSTEM FOR RAILROADS
Filed Jan. 14, 1947 3 Sheets-Sheet 1

Fig.1.

INVENTORS
G.J.JOHANEK and
T.J.JUDGE
BY
Neil W. Preston
Their ATTORNEY

Fig. 2.

Patented Sept. 8, 1953

2,651,711

UNITED STATES PATENT OFFICE 2,651,711

CENTRALIZED TRAFFIC CONTROLLING SYSTEM FOR RAILROADS

George J. Johanek and Thomas J. Judge, Rochester, N. Y., assignors to General Railway Signal Company, Rochester, N. Y.

Application January 14, 1947, Serial No. 721,902

10 Claims. (Cl. 246—3)

This invention relates to centralized traffic control signaling systems for railroads and more particularly pertains to improvements in systems of the unit wire type having direct wire connections from a control office to the field control apparatus associated with the respective switches and signals.

In unit wire centralized traffic control systems commonly employed in practice, the sequence of operation of the respective switch and signal control levers to establish a route and clear a signal for a train is that the switch control lever is operated first, and then the signal control lever, the circuit organization being such as to allow the energization of a signal control relay in the field in response to the operation of the signal control lever in the office, only after the track switch is operated to its designated position. If the track switch fails to complete its operation because of an obstruction of the switch points, or for other reasons, the operator may cause the restoration of the switch to its former position by restoring the switch control lever to its former position. If the operator fails to restore the signal control lever to its stop position before he restores the switch control lever, a signal may be cleared inadvertently over the wrong route when the restoration of the track switch to its former position becomes effective. Although this is not an unsafe condition, delays due to trains being dispatched over wrong routes are obviously costly.

Generally speaking, and without defining the scope of the present invention, the system according to the present invention provides for the interruption of a switch control relay circuit by a signal control governed lock relay immediately upon designation of a signal to be cleared, irrespective of whether or not the track switch over which the signal governs has been fully operated to its position in correspondence with the switch position that has been designated. By using a magnetic stick switch control relay, this relay is maintained in its last operated position, irrespective of its actuating energy being removed, and thus energy for the power operation of an associated track switch to its last designated position is not interrupted by the lock relay. The lock relay, however, prevents the power operation of the track switch back to its former position until the signal control lever governing the lock relay has first been restored to its normal position. Thus there is no possibility of the clearing of a signal over a wrong route under a condition where a track switch fails to complete its operation and is restored to its former position. This is true, because, in order to condition the switch control relay for causing power operation back to the former position of the track switch, the signal control lever must first be restored to its normal position, and thus there is no signal designated to be cleared at the time when power can be applied to drive the track switch back to its former position.

It is an object of the present invention therefore to prevent the inadvertent setting up of the wrong route under the above described conditions by locking the track switch, or track switches, included in that route against reversal in its operation, in response to the designation of a signal to be cleared over that track switch, irrespective of the position of the track switch at the time such signal is designated to be cleared, but yet allowing completion of operation of the track switch to the position last designated prior to the locking becoming effective.

Another object of the present invention is to allow the designation of a signal to be cleared for governing over a track switch to be effective to energize a signal control relay in the field, only if the switch control circuit between the office and field for that track switch has been closed and energized with a proper polarity to operate the track switch in correspondence with the switch control last designated, irrespective of the actual position of such track switch.

Another object of the present invention is to provide an interlock at the control office to prevent the clearing of a signal governing traffic over an inferior route of two optional routes for a particular direction of traffic.

Other objects, purposes, and characteristic features of the present invention will be in part obvious from the accompanying drawings and in part pointed out as the description progresses.

In describing the invention in detail, reference is made to the accompanying drawings in which those parts having similar features and functions are designated by like letter reference characters which are generally made distinctive by reason of preceding numerals indicative of the location of the switch or signal with which such parts are associated, and in which.

The illustrations employed in the disclosure of the present invention have been arranged to facilitate the disclosure of the invention more particularly as to the mode of operation and the principles involved than for the purpose of illustrating the actual construction and arrangement of parts that would be employed in practice. Thus the relays and their contacts are shown in a form conventionally employed in schematic wiring diagrams, certain relay contacts being shown in written circuit form and identified as of particular relays by corresponding reference characters appearing directly above such contacts.

The symbols (+) and (−) are employed to indicate the positive and negative terminals respectively of suitable batteries or other suitable source of direct current, and the symbols (B+) and (B−) are employed to indicate the respective positive and negative terminals of a suitable source of direct current having a center tap designated as (CN).

Figure 1:
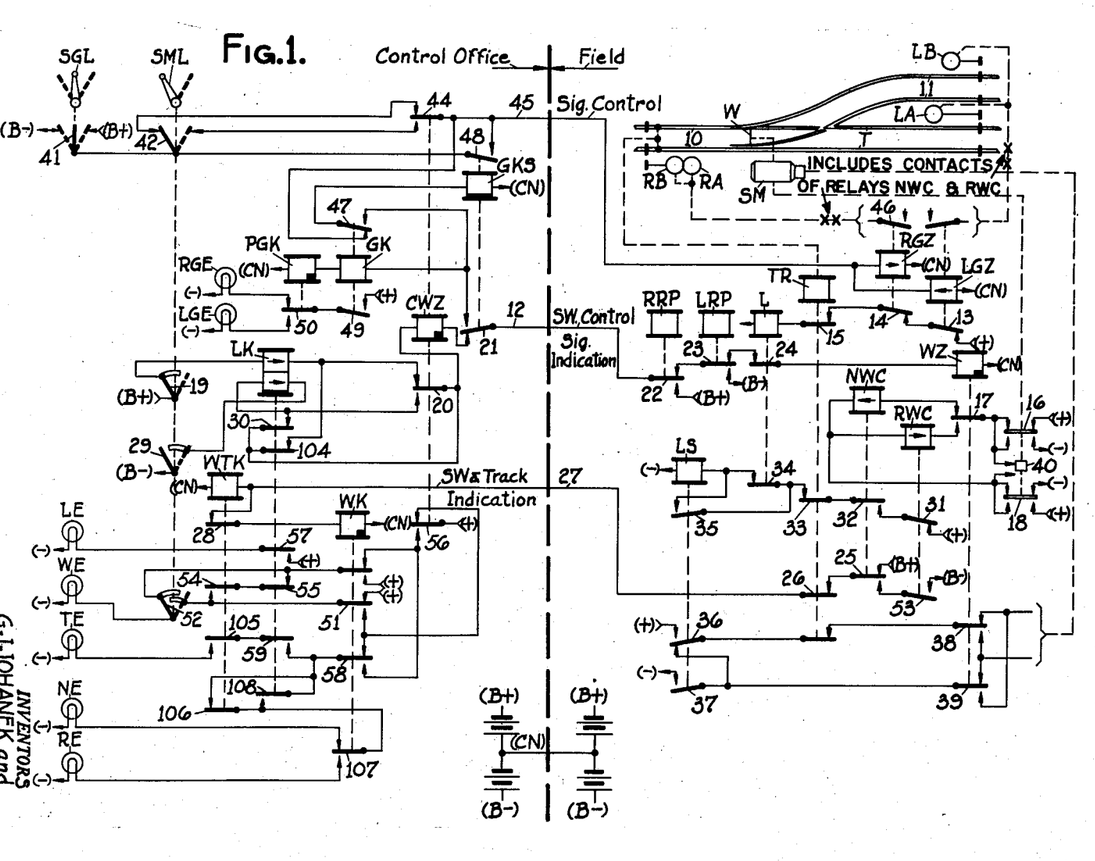
Fig. 1 shows one embodiment of the present invention in which a track switch and signals in the field are controlled by direct wire control from a control office, and indications are provided at the control office by direct wire control from the location of the switch and signals in the field.

Although it will be readily apparent as the description progresses that the present invention is readily adaptable to the control of switches and signals for practically any track layout to be encountered in practice, the track layout chosen for the embodiment shown in Fig. 1 is of a simple nature to facilitate in the disclosure of the present invention rather than to limit the number of forms which the present invention may assume. The track layout shown in Fig. 1 comprises a main track 10 having another track 11, which could be the end of a passing siding, or the end of a stretch of double track, connected thereto by a track switch W operated by a power switch machine SM.

The switch machine SM is of a suitable type for operating the track switch W such, for example, as the type shown in the patent to W. K. Howe, Patent No. 1,466,903, dated September 4, 1923. The motor of the switch machine SM is assumed to be controlled in a suitable manner, preferably providing overload protection as is shown, for example, in the patent to W. H. Hoppe et al., Patent No. 1,877,876, dated September 20, 1932. If the switch machine motor is controlled in accordance with that Hoppe et al. patent the relay WZ of the present disclosure is effective to control the relay CR of that patent. There is also associated with the track switch W a switch point detector contact mechanism which may be a part of the switch machine as is shown, for example, in the patent to C. S. Bushnell, Patent No. 1,517,236, dated November 25, 1924.

Signals of the searchlight type, such as is shown, for example, in the patent to O. S. Field, Patent No. 2,239,316, dated April 22, 1941, are provided for governing both directions of traffic through the track switch W, the signals RA and RB being provided for governing eastbound traffic (to the right), and the signals LA and LB being provided for governing westbound traffic (to the left). It is desired to be understood that the present invention is in no way limited to the particular type of signals illustrated, and that position light signals, semaphore signals, or signals having individual color lamp units could as well be employed.

The control of the track switch and of the signals is accomplished by the manipulation of switch and signal control levers SML and SGL respectively, on a suitable control machine at the control office, suitable indications being provided, generally on a control panel having a miniature diagram of the track layout in the field, as to the conditions of the switch and signals, and the condition of occupancy of the conventional OS track section T of the track layout.

The control of the track switch W is effected by the selective energization of a switch control circuit extending from the control office to the field with one polarity or the other to operate the magnetic stick switch control relay WZ to a picked-up or dropped-away position in accordance with the polarity of energization of that relay. Connected in series with the relay WZ is a magnetic stick relay CWZ at the control office which is actuated to a picked-up or knocked-down position in correspondence with the operation of the similar magnetic stick relay WZ in the field. A magnetic stick relay having a suitable structure for use as a WZ or CWZ relay is found, for example, in the prior application of J. E. Willing et al., Ser. No. 697,452, filed September 17, 1946.

A neutral relay LK is connected in series with the switch control circuit for the prevention of the preconditioning of the track switch W. In other words, the use of the relay LK provides that the polarity of energization of the switch control circuit cannot be changed from the polarity by which the track switch has last been operated unless the track switch is free to be operated at the time when the operator positions the switch control lever to call for the power operation of the track switch to another position.

The control of the signals is accomplished by the selective energization of a signal control circuit extending from the control office to the field by the positioning of the three position signal control lever SGL for picking-up one or the other of the relays RGZ and LGZ.

The relays RGZ and LGZ are of the biased polar type so as to be responsive only to a particular polarity of energization. A relay of this character is disclosed, for example, in the prior patent of G. E. Duffy, Patent No. 2,414,583, dated Jan. 21, 1947. By using relays RGZ and LGZ of the biased polar type, poled oppositely in the signal control circuit, one relay is responsive to one polarity of energization of the signal control circuit, and the other relay is responsive to the opposite polarity of energization of the signal control circuit.

For the purpose of allowing the track switch W to be operated only under safe conditions, lock relays L and LS are provided in the field to open the control circuit for the switch control relay WZ under certain conditions and apply a shunt across the switch control wires in a manner to be hereinafter considered.

Indications as to the conditions of the signals are provided over the same control wires used for switch control purposes at times when the switch control circuit is not required to be energized as selected by the signal indication stick relay GKS which is picked up by the energization of the signal control circuit and maintained picked up as long as the associated signal is cleared. The picking up of the relay GKS opens the switch control circuit and connects the neutral signal indication relay GK, and magnetic stick indication relay PGK to the control wire 12 which is used jointly for switch control and signal indication purposes.

The switch and track indications are provided by the conditioning of the magnetic stick relay WK and the neutral relay WTK respectively.

Having thus described the structure and general organization of the apparatus, a more detailed consideration will now be given to the circuit organization with reference to the mode of operation of the system under certain typical operating conditions.

The condition of the apparatus as illustrated in Fig. 1 assumes that the signals RA, RB, LA and LB are at stop and the track switch W is in its normal locked position in alignment for train movement along the main track. The respective switch and signal control levers SML and SGL at the control office are positioned in accordance with the conditions of the apparatus in the field.

Under the above described conditions of the system which for convenience can be considered as the normal conditions of the system, the signal repeater relays RRP and LRP in the field are picked up in accordance with the signals being at stop, the relay RRP being picked up only at times when the signals RA and RB are both at stop and the relay LRP being picked up only at times when signals LA and LB are both at stop. Although the control circuits have not been shown for the relays RRP and LRP, it is to be understood that such relays are controlled in a conventional manner, such as is shown, for example, in the patent to T. J. Judge, Patent No. 2,350,620, dated June 6, 1944, for the control of relays RGP of that patent.

The relay TR associated with the OS track section T is normally energized by a conventional track circuit (not shown), and in accordance with the energization of that relay, with the signal control relays RGZ and LGZ deenergized, the lock relay L is normally energized by a circuit extending from (+), including back contact 13 of relay LGZ, back contact 14 of RGZ, front contact 15 of relay TR and winding of relay L, to (—).

The normal correspondence relay NWC is picked up under the conditions as illustrated in Fig. 1 to repeat the normal position of the track switch W in correspondence with the contacts of the magnetic stick relay WZ. The circuit by which the relay NWC is maintained in its picked-up position under such conditions extends from (+), including contact 16 of the detector contact mechanism of the switch machine SM in its normal position, front contact 17 of relay WZ, winding of relay NWC and contact 18 of the detector contact mechanism of the switch machine SM, to (—).

At the control office, the relay LK is picked up because of the control circuit being closed for the relay WZ. Such circuit extends from (B+), including contact 19 of the switch control lever SML in its left-hand position, upper winding of relay LK, front contact 20 of relay CWZ, winding of relay CWZ, back contact 21 of relay GKS, wire 12, front contact 22 of relay RRP, front contact 23 of relay LRP, front contact 24 of relay L and winding of relay WZ, to (CN). It will be noted that the circuit just described includes the windings of relays LK, CWZ, and WZ, in series, and that the relays CWZ and WZ are poled alike so that they are actuated to corresponding picked-up positions.

The switch and track indication relays, WTK and WK are energized to indicate the unoccupied condition of the track section T and the normal position of the track switch W respectively. The circuit by which the relay WTK is energized extends from (B+), including front contact 25 of relay NWC, front contact 26 of relay TR, wire 27 and winding of relay WTK, to (CN). Upon the closure of front contact 28 of relay WTK, the relay WK is energized in an obvious manner to actuate its contacts to their picked-up positions. Because of the relay WK being a magnetic stick relay, it is maintained in its last operated position, irrespective of the interruption of its circuit when the OS track section T becomes occupied by a train.

To consider a typical condition in the establishment of a route through the track layout shown in Fig. 1, it will be assumed that the operator of the control machine desires to establish a route governed by the signal RB for eastbound traffic over the track switch W in its reverse position. To designate the establishment of such route, the operator first actuates the switch control lever SML to its right-hand position and then actuates the signal control lever SGL to its right-hand position.

Upon the actuation of switch control lever SML to its right-hand position, the switch control circuit for the energization of the relay WZ in the field has its polarity reversed. The circuit that has been heretofore described for the energization of the relay WZ is opened at contact 19 of lever SML, and energy of the opposite polarity is applied to the relay WZ by a circuit extending from (B—), including contact 29 of lever SML in its right-hand position, lower winding of relay LK, front contact 30 of relay LK, winding of relay CWZ, back contact 21 of relay GKS, wire 12, front contact 22 of relay RRP, front contact 23 of relay LRP, front contact 24 of relay L and winding of relay WZ, to (CN). It will be noted that energy flows through the lower winding of relay LK and the stick contact 30 of that relay in a direction to maintain such relay picked up, the relationship between the contacts 19 and 29 of the lever SML being such that the contact 29 is closed before the contact 19 is opened, and thus the relay LK is maintained in its picked-up position upon the actuation of the switch control lever SML from one position to the other.

At the time of the shifting of the contact 17 of relay WZ, because of the energization of that relay with reverse polarity, the correspondence relay NWC is dropped away, and the dropping away of that relay is effective to cause the picking up of the lock stick relay LS for applying energy to the switch machine SM. Relay LS is picked up under such conditions by energization of a circuit extending from (+), including back contact 31 of relay RWC, back contact 32 of relay NWC, front contact 33 of relay TR, front contact 34 of relay L and winding of relay LS, to (—). The picking up of that relay closes a stick circuit at front contact 35 to shunt front contact 34 of relay L out of the circuit just described. The picking up of the relay LS applies energy to the switch machine SM by the closure of front contacts 36 and 37, the polarity of energization of the switch machine being determined by the pole changing contacts 38 and 39 of the relay WZ as being of reverse polarity in accordance with the back contacts 38 and 39 of the relay WZ being closed.

When the track switch W is in midstroke, a shunt is applied to the control wires for the correspondence relays NWC and RWC by the contact 40 of the detector contact mechanism of the switch machine SM, thus preventing the energization of either relay NWC or RWC until the track switch W has been fully operated to its designated normal or reverse position. Under the above assumed conditions, when the track switch W has reached its full reverse locked position, the shunt applied across the wires is removed by the detector contact mechanism of the switch machine SM, and a circuit is established upon the closing of contacts 16 and 18 of that mechanism for the energization of the relay RWC with a polarity to cause that relay to be picked up. The circuit by which relay RWC is thus energized extends from (+), including contact 18 of the detector contact mechanism of switch machine SM, winding of relay RWC, back contact 17 of relay WZ and contact 16 of the detector contact mechanism of the switch machine SM, to (—).

When the operator actuates the signal control lever SGL to its right-hand position, subsequent to having operated the switch control lever SML to its right-hand position, the field signal control relay RGZ for controlling signals used in governing eastbound traffic is picked up, provided that the relay CWZ has been conditioned in correspondence with the position of the switch control lever SML to indicate that the switch control circuit for the relay WZ has been closed and energized with a polarity in correspondence with the position of the lever SML. Thus, assuming the lever SML to be in its right-hand position as above described, the relay RGZ is picked up by the energization of a circuit extending from (B+), including contact 41 of signal control lever SGL in its right-hand position, contact 42 of switch control lever SML in its right-hand position, back contact 44 of relay CWZ, wire 45, and winding of relay RGZ, to (CN).

Figure 2:
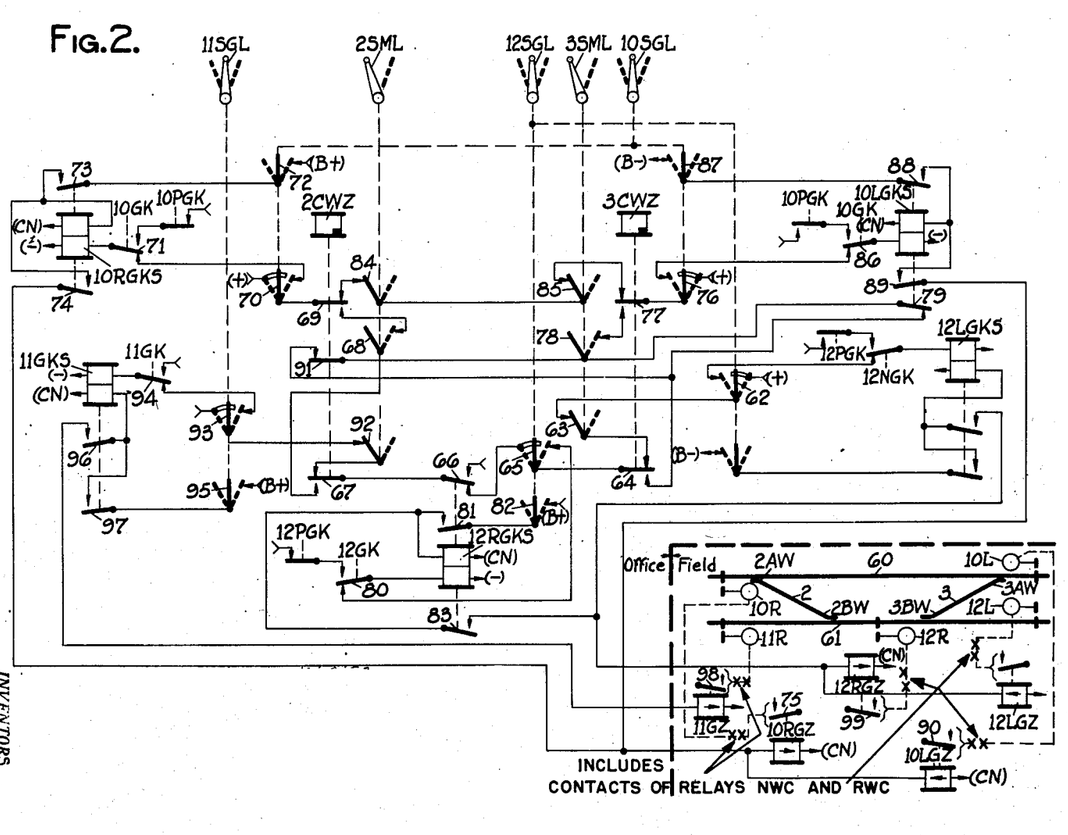
Fig. 2 shows the manner in which signals can be controlled according to the present invention for governing traffic through a track layout having optional routes; and, Fig. 3 illustrates a modification in the switch control and signal indication circuits of Fig. 1.

After the reverse correspondence relay RWC has been picked up to indicate that the track switch W has completed its operation to its reverse position, a signal control circuit is closed in the usual manner, dependent upon front contact 46 of relay RGZ, for energizing the signal RB with a polarity to cause that signal to indicate caution. The details of the signal control circuits in response to the relay RGZ can be provided, for example, as shown in the prior application of T. J. Judge, Ser. No. 655,622, filed March 19, 1946, now Pat. No. 2,635,182, dated April 14, 1953. Thus, the dotted lines leading to the signals in Figs. 1 and 2 are to be understood to include switch correspondence contacts and other conventional signal control contacts represented in the drawings by "xx." These switch correspondence contacts can be employed as shown, for example, as contacts 249 and 250 of relays 1NCR and 1RCR in the circuit for signal 3A in Fig. 3A of the above identified Judge Patent No. 2,635,182. Thus, the signal governing entrance to a route is permitted to clear only after the route has been properly aligned, with the track switches in their full normal or reverse locked positions.

The picking up of the relay RGZ renders the locking effective by opening the circuit for the relay L at back contact 14 and the dropping away of relay L opens the pickup circuit for relay LS at front contact 34. The inclusion of the stick contact 35 of relay LS in multiple with contact 34 of relay L is effective to maintain the relay LS picked up until the track switch W has been fully operated to its designated position, irrespective of the dropping away of the relay L before such operation has been completed. Once the operation of the track switch has been completed, and a correspondence relay NWC or RWC is picked up to open the pick-up circuit for the relay LS at back contact 32 or back contact 31 respectively, the relay LS is dropped away, thus applying a shunt across the control wires for the switch machine SM closed at back contact 36 of relay LS. Once the relay LS has been dropped away under such conditions, it can be again picked up for applying energy to the switch machine SM only after the relay L is picked up to indicate that the signals are at stop and that the OS track section T is unoccupied.

It will also be noted that the dropping away of the relay L in response to the picking up of the signal control relay RGZ is effective to open the circuit for the control of relay WZ at front contact 24, and thus prevent energization of that relay again until the signal control lever SGL at the control office has been restored to its center position. Thus it can be said that the picking up of the signal control relay RGZ locks the track switch W with respect to changing the position of that track switch, but the lock stick relay LS is effective to allow the track switch W to complete its operation to its last designated normal or reverse position.

Taking this circuit organization into consideration, if the track switch W fails to be operated to its reverse designated position because of an obstruction in the switch points or for some other reason, the restoration of the switch control lever SML to its left-hand position can not be effective to pick up the relay WZ, if the lock relay L is dropped-away, as by the signal control relay RGZ or LGZ being picked up in accordance with the signal control lever SGL being in its respective right-hand or left-hand position. Thus, if the operator desires to restore the track switch W to its normal position, because of such track switch failing to complete its operation to its reverse position, he must first restore the signal control lever SGL to its center position and thereby close the circuit for the lock relay L to cause that relay to be picked up and thus condition the circuit for the magnetic stick relay WZ by the closing of front contact 24. It is therefore provided that should the operator restore the switch control lever SML to its normal position, without having first restored the signal control lever SGL to its center position, the track switch W could not be restored to its normal position, and thus the signal RA could not be inadvertently cleared for a route through the track switch W in its normal position if the operator should neglect to restore the signal control lever SGL to its center position prior to the restoration of the switch control lever SML to its normal position.

Assuming the signal control lever SGL to be restored to its center position, the opening of the signal control circuit for the relay RGZ at contact 41 of lever SGL causes the dropping away of that relay, and the relay L is restored to its normally energized position, provided that the OS track section T is unoccupied by a train, upon the closure of back contact 14 of relay RGZ.

Upon the picking up of the relay L, the relay LK is picked up, provided that the lever SML remains in its right-hand position corresponding to the last condition of energization of the relay CWZ. The relay LK is picked up under such conditions by the energization by a circuit extending from (B—), including contact 29 of lever SML in its right-hand position, lower winding of relay LK, back contact 20 of relay CWZ, winding of relay CWZ, back contact 21 of relay GKS, wire 12, front contact 22 of relay RRP, front contact 23 of relay LRP, front contact 24 of relay L and winding of relay WZ, to (CN). The energization of this circuit does not effect the shifting of contact 20 of relay CWZ, as the polarity of energization of such circuit is such as to cause the relay CWZ to remain actuated to its dropped-away position.

After the relay LK has become picked-up, if the operator desires to restore the track switch to its normal position, he actuates the lever SML to its left-hand position, and in accordance with such operation, the switch control circuit including the relays CWZ and WZ is energized with normal polarity to cause the picking up of such relays. The circuit by which relays CWZ and WZ are energized under such conditions extends from (B+), including contact 19 of lever SML in its left-hand position, upper winding of relay LK, front contact 104 of relay LK, winding of relay CWZ, back contact 21 of relay GKS, wire 12, front contact 22 of relay RRP, front contact 23 of relay LRP, front contact 24 of relay L and winding of relay WZ, to (CN).

The picking up of relay WZ by such energization is effective to pole change the circuit for the switch machine SM by the shifting of contacts 38 and 39 and thereby cause the track switch W to be restored to its normal position. Upon such restoration, the normal correspondence relay NWC is picked up and the circuit is opened for the relay LS at back contact 32 to cause the restoration of that relay and the closing of a shunt at back contact 36 across the wires of the control circuit for the switch machine SM.

It will be noted that the mode of operation of the relay LK as described above is such as to require that the lever SML be positioned in correspondence with the relay CWZ at a time when the switch control circuit can be closed before energy may be applied to the switch control circuit for changing the position of the track switch W. This mode of operation provides what is commonly known in practice as "prevention of preconditioning."

Although the above described mode of operation of the system has been specific to the condition involving the reversal of operation of the track switch W in midstroke, it should be readily apparent that a similar mode of operation is effective in operating the track switch from its full reverse position to its normal position, the shifting of contact 17 of the relay WZ upon initiating such operation being effective to cause the dropping away of the correspondence relay RWC, which in turn is effective under such conditions to cause the picking up of the relay LS for applying energy to the switch machine SM through the pole changing contacts 38 and 39.

For providing switch and track indications at the control office, an indication circuit is provided separate from the switch and signal control circuits, extending between the field and the control office and including the wire 27; but the signal indications are provided by employing the same wire 12 which is used for the control of the magnetic stick relay WZ in the field. The use of the switch control wire 12 for signal indications is facilitated by employing a magnetic stick relay WZ for switch control because once such magnetic stick relay has been positioned, the switch control circuit can be opened to use the wire 12 for signal indication purposes without interrupting the control of the switch machine SM. It is therefore provided that after it has been checked that the switch control circuit is closed and energized with a polarity in correspondence with the position of the switch control lever SML, the switch control circuit can be opened by the picking up of the relay GKS at the control office in response to the positioning of the signal control lever SGL, and the picking up of the relay GKS conditions a circuit for the energization of the signal indication relays GK and PGK, including the wire 12 extending from the control office to the field location.

The relay GKS is a neutral relay and is therefore responsive to either polarity of energization applied to the signal control wire 45 by the signal control lever SGL in either its right-hand or its left-hand position and the energy applied to its stick circuit from the field is always of a corresponding polarity. Assuming the track switch W to be operated to its reverse position as described above in correspondence with the lever SML in its right-hand position, the relay GKS is picked up at the control office upon the actuation of the signal control lever SGL to its right-hand position by the energization of a circuit extending from (B+), including contact 41 of lever SGL in its right-hand position, contact 42 of lever SML in its right-hand position, back contact 44 of relay CWZ, back contact 47 of relay GK and winding of relay GKS, to (CN). Upon the picking up of relay GKS a stick circuit is closed at front contact 48 to shunt the contacts 42 and 44 of lever SML and relay CWZ out of the circuit just described to prevent the dropping away of the relay GKS, and also the interruption of the signal control circuit for the relay RGZ, in case the switch control lever SML is inadvertently restored to its normal position prior to the restoration of the signal control lever SGL to its center position.

In accordance with the clearing of a signal RA or RB for governing eastbound traffic, the signal repeater relay RRP is dropped away, and the dropping away of that relay is effective to energize relays GK and PGK in series at the control office with a polarity to cause the energization of the signal indicator lamp RGE. The circuit for relays GK and PGK extends from (B+), including back contact 22 of relay RRP, control wire 12, front contact 21 of relay GKS, winding of relay GK and winding of the magnetic stick relay PGK, to (CN). Upon the picking up of these relays, an obvious circuit is closed for the lamp RGE including front contact 49 of relay GK and front contact 50 of relay PGK.

Upon the picking up of the relay GK, the shifting of contact 47 opens the pick-up circuit which has been described for the relay GKS, and establishes a stick circuit for such relay dependent upon the closure of back contact 22 of the signal repeater relay RRP in the field. Such circuit extends from (B+), including back contact 22 of relay RRP, control wire 12, front contact 21 of relay GKS, front contact 47 of relay GK and winding of relay GKS, to (CN). The relay GKS is sufficiently slow in dropping away to be maintained picked up upon the shifting of contact 47 of relay GK. It is provided by the closure of the stick circuit just described for the relay GKS that such relay is maintained picked up, subsequent to the restoration of the signal control lever SGL to its center position, until the signal governed by such lever is actually restored to stop and the repeater relay RRP associated therewith is restored to its pick-up position to open the circuit for the signal indication relays GK and PGK to cause the extinguishing of the signal indicator lamp RGE.

The switch correspondence lamp WE is energized when the track switch W is out of correspondence with the position of the switch control lever SML. Thus upon the actuation of the lever SML to its right-hand position as described above, the lamp WE becomes energized by a circuit extending from (+), including front contact 51 of relay WK, contact 52 of lever SML in its right-hand position and lamp WE to (—). When the operation of the track switch W has been initiated, to cause the dropping away of the correspondence relay NWC or RWC (whichever one has last been energized) the opening of front contacts 25 and 53 of those relays deenergizes the indication circuit including the wire 27, and the neutral relay WTK is dropped away. The dropping away of such relay, by the opening of front contact 28, provides that the relay WK can be again energized only after continuity has been established in the circuit for the relay WK, and such relay has responded to its energization. With the relay WTK dropped away when the track switch is in midstroke energy is applied through the contacts 54 and 55 of relays WTK and LK respectively to effectively shunt the contact 52 out of the circuit for the correspondence lamp WE to maintain that lamp energized irrespective of the manner in which the lever SML may be operated.

When the track switch W has completed its operation to its designated reverse position, the switch indication circuit is energized to pick up the relay WTK, and by the closure of front contact 28 to energize the relay WK with a polarity to cause the actuation of its contacts to their dropped-away positions. This opens the circuit for the lamp WE at front contact 51 of relay WK. The closure of back contact 51 of relay WK cannot apply energy to the lamp WE through front contact 56 of relay CWZ because relay CWZ has its contacts actuated to their dropped-away positions at that time to correspond with the reverse switch position which is assumed to have been designated by an operator. It will be readily apparent that a mode of operation similar to that described above is effective when the track switch W is operated from its reverse to its normal position.

The lock indicator lamp LE at the control office is normally dark and is energized by an obvious circuit closed at back contact 57 of relay LK whenever that relay is deenergized to open the switch control circuit and thus provide for the electric locking of the track switch W in its last operated position. Thus the lamp LE becomes energized upon the reception of a control in the field for clearing a signal, or upon the dropping away of the track relay TR associated with the OS track section T. The restoration of continuity in the switch control circuit including the control wire 12 extinguishes the lamp LE by the opening of back contact 57.

It will be noted that relay LK can again be picked up after it has been dropped away as by the clearing of a signal governing passage of a train over the track switch W, only if the magnetic stick relay CWZ is positioned in correspondence with the switch control level SML. When the relay CWZ is out of correspondence with the switch control lever SML, the circuit through the relay LK is established only if a stick circuit through front contact 30 or 104 of that relay is closed, thus requiring that the relay LK be picked up with the lever SML in correspondence with the relay CWZ before a circuit can be established for energizing the switch control wire 12 with the lever SML out of correspondence with the position of the relay CWZ.

The opening of the circuit including the indication wire 27 by the dropping away of the track relay TR at front contact 26 in accordance with the occupancy of the OS track section T is effective to cause the dropping away of the track indication relay WTK, and by the dropping away of that relay under such conditions, the track indicator lamp TE becomes energized. Thus, if the track switch W is in its normal position, the lamp TE is energized by a circuit extending from (+), including front contact 56 of relay CWZ, front contact 58 of relay WK, back contact 59 of relay LK, back contact 105 of relay WTK, and lamp TE, to (—). Similarly if the OS track section T becomes occupied by a train when the track switch W is in its reverse position, the circuit for the lamp TE extends from (+), including back contact 56 of relay CWZ, back conact 58 of relay WK, back contact 59 of relay LK, back contact 105 of relay WTK and lamp TE to (—). The picking up of the relay WTK when the OS track section again becomes unoccupied is effective in an obvious manner to extinguish the lamp TE by the opening of back contact 105.

Although the above described indications are generally sufficient to convey the desired information to an operator of a control machine of conditions in the field, it may be desirable in practice to indicate the respective positions in which the track switch W is locked in correspondence with controls designated at the control office. Thus the lamps NE and RE are provided for the respective normal and reverse switch positions. The lamp NE is energized when the track switch W is in its normal locked position in correspondence with the last switch control which has been designated such lamp being energized by a circuit extending from (+), including front contact 56 of relay CWZ, front contact 58 of relay WK, front contact 106 of relay WTK, front contact 107 of relay WK and lamp NE, to (—).

Assuming the switch control lever SML to be actuated to its right-hand position for reversal of the track switch W, the relay CWZ is energized with a polarity to open front contact 56, and thus the lamp NE is deenergized. The lamp RE remains deenergized until the track switch has completed its operation to its reverse position so as to energize the magnetic stick relay WK with a polarity to actuate the contacts of that relay to their dropped-away positions, and thus close the circuit for the lamp RE extending from (+), including back contact 56 of relay CWZ, back contact 58 of relay WK, front contact 106 of relay WTK, back contact 107 of relay WK and lamp RE, to (—). The inclusion of back contact 108 of relay LK in multiple with front contact 106 of relay WTK in the circuits for the lamps NE and RE provides for the energization of either selected one of such lamps at times when the track switch W is locked. It is therefore provided that the energization of either of the lamps NE or RE must be in accordance with the electric locking of the track switch W in a position in correspondence with the last designated switch control, or in accordance with the track switch W being in a position in correspondence with the last designated switch control when the OS track section is unoccupied.

It is to be understood that any combination of the above described indications can be employed in a system provided according to the present invention in accordance with the requirements of practice. Inasmuch as the lamps NE and RE when contemporaneously deenergized indicates an out of correspondence condition, the correspondence lamp WE may not be required when the lamps NE and RE are employed. If the lamp WE is used and the lamps NE and RE are not used, the extinguishing of the lamp WE indicates that the track switch W has been actuated to a position corresponding to the position of the lever SML.

When the present invention is applied to track layouts having a plurality of crossover or single track switches, it is often desirable to arrange the signal control selections in the form of a circuit network, particularly for the purpose of providing prevention for the establishment of run-around routes where optional routes are involved. An embodiment illustrating how the signal control selections can be provided in the form of a circuit network is illustrated in Fig. 2 in which a circuit network is provided for a track layout having two parallel tracks 60 and 61 connected by the crossovers 2 and 3 to provide possible optional routes in the track layout between the opposing signals 10R and 10L which are provided for governing respective eastbound and westbound traffic. The signal 11R is provided for governing eastbound traffic through the track switch 2BW at the lower end of the crossover 2, and the signals 12R and 12L are provided for governing respective eastbound and westbound traffic through the track switch 3BW at the lower end of the crossover 3.

Switch and signal control levers SML and SGL are associated with the respective crossovers and signals as identified by the use of preceding numeral reference characters indicative of the particular crossovers or signals with which such levers are associated.

It has been found desirable for the track layout illustrated in Fig. 2 that the passage of a westbound train from signal 10L to signal 10R be limited to the main track rather than allowing the clearing of that signal for the more indirect route via the crossovers 2 and 3. It is therefore provided that the signal 10L cannot be cleared with the track switches of the crossovers 2 and 3 in their reverse positions.

The situation for the opposite direction of traffic, however, is different in that the use of the signal 12R associated with the lower track at a point between the track switches 2BW and 3BW of the respective crossovers 2 and 3 allows a train to be routed from signal 10R to signal 12R and held until the upper of the two main tracks is available so that such train can be routed back to the upper track by the establishment of a route from the signal 12R over the track switches of the crossover 3 in their reverse positions. It is therefore desirable that the circuit network for the control of the signals be of a character to allow a route to be set up from signal 10R to signal 10L via crossovers 2 and 3 for eastbound traffic, but it is desirable to prevent the establishment of such route for westbound traffic.

For purposes of simplification of the disclosure of the embodiment of the invention shown in Fig. 2, certain of the relays such, for example, as the relays CWZ, GK and PGK have their contacts shown only in the conventional written circuit manner, the contacts being identified as of relays controlled similar to relays of Fig. 1 by use of corresponding letter reference characters.

To consider the establishment of a typical route, it will be assumed that the operator desires to clear the signal 10R for governing traffic over the crossover 2 to the signal 12R. He therefore actuates the lever 2SML for the crossover 2 to its right-hand position for causing the operation of the track switches 2AW and 2BW to their reverse positions, and in accordance with the energization of the switch control circuits (not shown) for such track switches, the relay 2CWZ being energized by a circuit comparable to the circuit for relay CWZ of Fig. 1 with reverse polarity to cause the dropping away of that relay. The dropping away of that relay establishes a circuit whereby the relay 10RGKS can be picked up for closing the signal control circuit for the picking up of the relay 10RGZ in the field. The circuit by which relay 10RGKS is energized upon the actuation of the signal control lever 10SGL to its right-hand position extends from (+), including contact 62 of lever 12SGL in its center position, contact 63 of lever 3SML in its left-hand position, front contact 64 of relay 3CWZ, contact 65 of lever 12SGL in its center position, back contact 66 of relay 12RGKS, back contact 67 of relay 2CWZ, contact 68 of lever 2SML in its right-hand position, back contact 69 of relay 2CWZ, contact 70 of lever 10SGL in its right-hand position, back contact 71 of relay 10GK and lower winding of relay 10RGKS, to (—).

Upon the picking up of relay 10RGKS, a stick circuit is established to maintain that relay picked up, irrespective of correspondence between the relay 2CWZ and the switch control lever 2SML, such circuit extending from (B+), including contact 72 of lever 10SGL in its right-hand position, front contact 73 of relay 10RGKS and upper winding of relay 10RGKS, to (CN). The picking up of relay 10RGKS also closes a circuit for energizing the relays 10RGZ and 10LGZ in the field with a polarity to cause the relay 10RGZ to be picked up. The circuit by which the relay 10RGZ is picked up extends from (B+), including contact 72 of lever 10SGL in its right-hand position, front contact 73 of relay 10RGKS, front contact 74 of relay 10RGKS and winding of relay 10RGZ, to (CN). Upon the picking up of relay 10RGZ the closing of front contact 75 allows the signal 10R to clear for governing passage of an eastbound train over a crossover 2, after the track switches of such crossover 2 have completed their operation to their reverse positions.

Assuming a route to be established as described above, and assuming that it is desired to establish a route over the crossover 3 governed by signal 12R for further progress of the train, the track switches of the crossover 3 are positioned in accordance with the actuation of the switch control lever 3SML to its right-hand position, and the signal 12R is allowed to clear subsequent to the actuation of the signal control lever 12SGL to its right-hand position.

In accordance with such manipulation of the switch and signal control levers, the relay 12RGKS is picked up by the energization of a circuit checking correspondence between the magnetic stick relay 3CWZ and the lever 3SML, each circuit extending from (+), including contact 76 of lever 10SGL in its right-hand position, back contact 77 of relay 3CWZ, contact 78 of lever 3SML in its right-hand position, back contact 79 of relay 10LGKS, back contact 64 of relay 3CWZ, contact 65 of lever 12SGL in its right-hand position, back contact 80 of relay 12GK and lower winding of the relay 12RGKS, to (−). The picking up of that relay establishes a stick circuit closed at contact 82 of lever 12SGL in its right-hand position to maintain such relay picked up, irrespective of correspondence between the relay 3CWZ and the lever 3SML. The picking up of relay 12RGKS closes a circuit for the energization of the oppositely poled control relays 12RGZ and 12LGZ in the field, such circuit being energized with a polarity to cause the relay 12RGZ to be picked up. The circuit by which the relay 12RGZ is energized under such conditions extends from (B+), including contact 82 of lever 12SGL in its right-hand position, front contact 81 of relay 12RGKS, front contact 83 of relay 12RGKS, and winding of relay 12RGZ, to (CN). The picking up of relay 12RGZ allows the clearing of signal 12R when conditions including the checking of the positions of the track switches of the crossover 3 are properly established.

If it is desirable to establish a route for a westbound train on the upper track from signal 10L to signal 10R, at a time when such route is available to be established, it is provided that such route can be established provided that the track switches of the crossovers 2 and 3 are operated to their normal positions to establish a direct route rather than to establish a run-around route including both of those crossovers. It is thus necessary that the operator first cause the operation of the track switches of the crossovers 2 and 3 to their normal positions by the actuation of the switch control levers 2SML and 3SML to their left-hand positions respectively. In accordance with the switch controls thus designated, the relays 2CWZ and 3CWZ are energized with a polarity to cause such relays to be picked up, and the picking up of those relays conditions a circuit by which the relay 10LGKS can be picked up in response to the actuation of the signal control lever 10SGL to its left-hand position.

Upon the actuation of the lever 10SGL to its left-hand position, energy is applied to the lower winding of the relay 10LGKS by a circuit extending from (+), including contact 70 of lever 10SGL in its left-hand position, front contact 69 of relay 2CWZ, contact 84 of lever 2SML in its left-hand position, contact 85 of lever 3SML in its left-hand position, front contact 77 of relay 3CWZ, contact 76 of lever 10SGL in its left-hand position, back contact 86 of relay 10GK and lower winding of relay 10LGKS, to (−). An obvious stick circuit is closed for relay 10LGKS at contact 87 of lever 10SGL in its left-hand position to maintain that relay energized, irrespective of the circuit network contact selections. Energy is also applied through contact 87 of lever 10SGL in its left-hand position and front contacts 88 and 89 of relay 10LGKS to the windings of the biased polar field relays 10RGZ and 10LGZ which are oppositely poled. The polarity of energization thus applied under the above assumed conditions is such as to cause the picking of up relay 10LGZ, and the picking up of that relay, by closing front contact 90 conditions the signal 10L to be cleared, dependent upon checking the normal positions of the track switches of the crossovers 2 and 3 in accordance with the usual practice in signal control circuits.

It will be noted that if the track switches of the crossovers 2 and 3 were in their reverse positions in correspondence with the reverse positions of the switch control levers 2SML and 3SML, the relay 10LGKS could not have been picked up to close its front contacts by a circuit including back contacts 69 and 77 of relays 2CWZ and 3CWZ because the branch of the circuit network comparable to the crossover would be open at back contact 79 of relay 10LGKS. Under such conditions relay 10LGKS vibrates its back contact 79, but cannot be picked up to close its front contacts. It is therefore provided that energy cannot feed through the portions of the circuit network comparable to the route between signal 10L and signal 10R including the crossovers 2 and 3 to pick up the relay 10LGKS.

The inclusion of the contact 91 of the relay 2CWZ in the portion of the circuit network that is comparable to the crossover 3, while preventing the setting up of an undesired route as described above, allows the setting up of a route from signal 12R over the crossover 3 when the track switches of crossover 2 are in their normal positions as in the establishment of a through route for westbound traffic extending from signal 11R to signal 10L.

To consider more specifically the manner in which such a route is established, it will be assumed that an operator causes the track switches of the crossover 2 to be operated to their normal positions by the actuation of the lever 2SML to its left-hand position, and that the lever 3SML for the track switches of the crossover 3 is operated to its right-hand position for causing the operation of the track switches 3AW and 3BW associated with such crossover to their reverse positions. The actuation of the signal control lever 11SGL to its right-hand position, subsequent to the designation of the positions of the track switches of the crossovers as has been described causes the picking up of the relay 11GKS by the energization of a circuit extending from (+), including contact 76 of lever 10SGL in its center position, back contact 77 of relay 3CWZ, contact 78 of lever 3SML in its right-hand position, front contact 91 of relay 2CWZ, back contact 64 of relay 3CWZ, contact 65 of lever 12SGL in its center position, back contact 66 of relay 12RGKS, front contact 67 of relay 2CWZ, contact 92 of lever 2SML in its left-hand position, contact 93 of lever 11SGL in its right-hand position, back contact 94 of relay 11GK and upper winding of relay 11GKS, to (−). Upon the picking up of relay 11GKS, a stick circuit is established including the lower winding of that relay and the contact 95 of lever 11SGL in its right-hand position. The picking up of relay 11GKS causes the picking up of the relay 11GZ by the energization of a circuit including front contacts 96 and 97 of relay 11GKS and contact 95 of the signal control lever 11SGL. In response to the picking up of the relay 11GZ, the closure of front contact 98 establishes a circuit to allow the clearing of signal 11R, subject to the usual track circuit control, and dependent upon the condition of the next signal in advance.

Upon the actuation of the lever 12SGL to its right-hand position, the relay 12RGKS is picked up for allowing the clearing of signal 12R. The pick-up circuit for relay 12RGKS extends from (+), including contact 76 of lever 10SGL in its center position, back contact 77 of relay 3CWZ, contact 78 of lever 3SML in its right-hand position, front contact 91 of relay 2CWZ, back contact 64 of relay 3CWZ, contact 65 of lever 12SGL in its right-hand position, back contact 30 of relay 12GK and lower winding of relay 12RGKS, to (—). The picking up of that relay establishes a stick circuit dependent upon the closure of contact 82 of lever 12SGL in its right-hand position to maintain such relay picked up irrespective of the correspondence selections of the circuit network. The relays 12RGZ and 12LGZ are energized upon the picking up of relay 12RGKS with a polarity to cause the picking up of the relay 12RGZ to close front contact 99 and thus allow the clearing of signal 12R.

Figure 3:
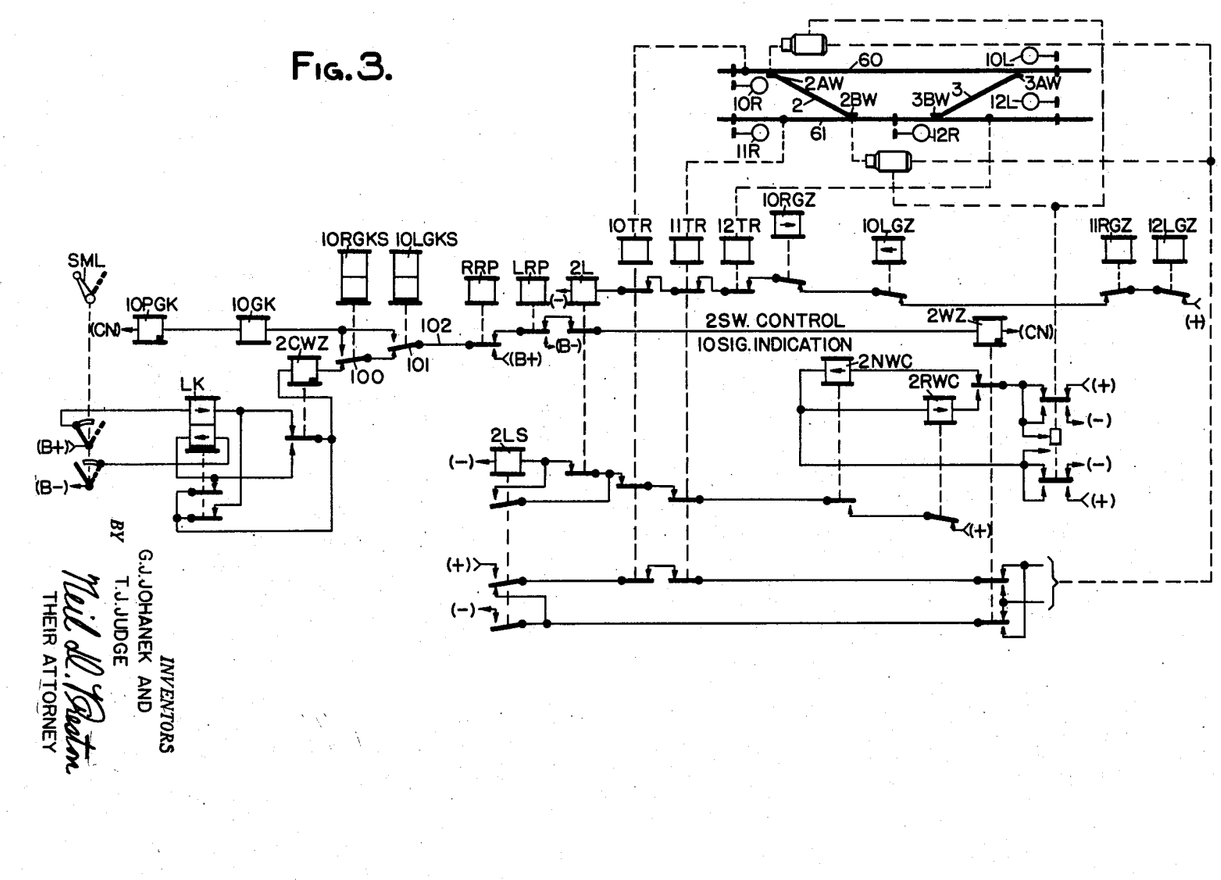

It is to be understood that the switch control and indication circuits for the embodiment of the present invention illustrated in Fig. 2 is provided according to the typical circuits of Fig. 1, such circuits being modified slightly where separate relays GKS are provided for the opposite directions of traffic associated with a single signal control lever. Under such conditions contacts of both of such relays are included in series in the switch control circuit which has associated therewith the indications of the signal governed by that signal control lever. Thus, with reference to Fig. 3, it is illustrated that the back contacts 100 and 101 of relay 10RGKS and 10LGKS are included in series in the switch control circuit for the track switches of the crossover 2, including the magnetic stick relay 2CWZ. It is thus provided that when either relay 10RGKS or 10LGKS is energized for allowing the clearing of a signal, the wire 102 is connected through a front contact 100 or 101 of the relay thus energized to provide for the energization of the signal indication relays 10GK and 10PGK in a manner corresponding to that which has been specifically described in considering the energization of the similar relays GK and PGK of Fig. 1. It will be readily apparent upon comparing the typical switch control circuit of Fig. 3 for governing the track switches of a crossover, with the typical switch control circuit of Fig. 1 for governing a single switch, that the circuits are substantially identical, and thus the description as has already been set forth with respect to the switch control circuit of Fig. 1 should be sufficient for an understanding of Fig. 3. It will be noted that the lock relays 2L and 2LS of Fig. 3 for crossover 2, according to usual practice, are governed by both associated track circuits, and relay L is subject to dropping away upon the clearing of any signal governing a route through either or both of the crossover switches.

Having thus described the present invention as applicable to the specific track layouts of Figs. 1 and 2, it is desired to be understood that these forms have been selected to facilitate in the disclosure of the invention rather than to limit the number of forms which the invention may assume, and it is to be further understood that various adaptations, alterations and modifications may be applied to the specific forms shown to meet the requirements of practice without in any manner departing from the spirit or scope of the present invention except as limited by the appending claims.

What we claim is:

1. A system for the control from a control office of a power switch and signals in the field comprising in combination, manually operable means for the respective switch and signals for the designation of respective desired switch positions and clear or stop conditions of the respective signals, electro-responsive means in the field distinctively responsive to its polarity of energization for governing the power operation of said track switch to a corresponding normal or reverse position, a polarized relay at the control office, a polarized control circuit including said polarized relay for energizing said electro-responsive means wherein the polarity of energization is governed by the switch position designated by the actuation of said manually operable means for the control of said track switch, and switch-locking means including a lock relay effective to open said control circuit in response to the designation by the operation of said manually operable means of a signal to be cleared and thereby prevent the subsequent designation of a different switch position from being effective to operate said track switch, said locking means being rendered effective by the actuation of said locking relay immediately in response to the designation of a signal to be cleared irrespective of the position of said track switch at that time, and said locking means being rendered effective only provided that said control circuit when last closed has been energized with a polarity corresponding to the switch position last designated as indicated by the position of said polarized relay.

2. In a system for the control of a power track switch and a signal, manually operable means at a control office for designating the respective desired positions for said power switch and the desired clear or stop indication for said signal, a lock relay in the field, a signal control circuit extending from the control office to the field effective in accordance with the clear or stop indication designated by said manually operable means to govern the clear or stop indication of said signal and effective to selectively control said lock relay in the field in accordance with the clear or stop indication manually designated, a magnetic stick relay at the control office and a magnetic stick relay in the field, and a switch control circuit having the windings of said magnetic stick relays and a contact of said lock relay connected in series, said circuit being subject to selective energization of one polarity or the other in accordance with the selective operation of said manually operable means to the respective normal and reverse positions of said track switch.

3. In a switch and signal control system for governing the power operation of a track switch and the clearing of a signal, manually operable means for designating the respective normal and reverse positions to which said track switch is to be operated, signal control means including a circuit extending from the control office to the field for governing the clear or stop indication of said signal and for governing the energization of a lock relay, a magnetic stick relay at the control office and a magnetic stick relay in the field, and a polarized switch control circuit comprising in series windings of said magnetic stick relays and a contact of said lock relay, said circuit having its polarity of energization selected by said manually operable means, and said circuit including means for allowing a change in the polarity of energization of said magnetic stick relays only provided that said manually operable means is initially in a position corresponding to the last controlled position for said track switch at a time when said switch control circuit is closed.

4. In a system for the control of a power switch and multiple aspect signals for governing traffic in both directions, manually operable means at a control office for designating the respective desired positions for operation of said power switch and the desired clear or stop aspect for said signals, a polarized relay at the control office and a polarized relay in the field, a lock relay, a polarized switch control circuit extending from the control office to the field for governing the power operation of said track switch, said circuit including a front contact of said lock relay and windings of each of said polarized relays in series, a polarized signal control circuit for governing said signals in accordance with the desired signal aspect that is designated by the actuation of said manually operable means, said signal control circuit including contact selections of said manually operable means for said track switch in correspondence with said polarized relay at the control office, and circuit means for energizing said lock relay only when said signal control circuit is deenergized, whereby said lock relay can be controlled to open said switch control circuit in response to the actuation of said manually operable means for designating a signal to be cleared, provided that said manually operable means for said power switch is in correspondence with the polarity of energization last applied to said switch control circuit, irrespective of the actual position of said track switch.

5. In combination, manually operable means at a control office for manually designating the desired clear or stop indication of a signal and the desired normal or reverse position of a power track switch, a lock relay, a switch control relay, a signal control relay, a switch control circuit for said switch control relay extending from the control office to the field for governing the power operation of said track switch, said circuit including electro-responsive means at the control office for repeating the last polarity of energization of the switch control circuit said circuit including a contact of said lock relay, and said circuit being energized with one polarity or the other in accordance with the actuation of said manually operable means, a signal control circuit for governing the energization of said signal control relay and said lock relay in accordance with the desired indication designated by said manually operable means at the control office, said signal control circuit including in series said signal control relay and contact selections at the control office of said manually operable means for designating the positions of said track switch in correspondence with contacts of repeating means for repeating the last polarity of energization of said switch control circuit, said signal control circuit being selectively energized or deenergized by the actuation of said manually operable means for designation of the clear or stop indication of said signal, and electro-responsive means energized in response to the closing of the portion of said signal control circuit including said contact selections of said manually operable means for said track switch in correspondence with said repeating means for shunting these contact selections out of said signal control circuit.

6. In a switch and signal control system of the character described for positioning a power track switch and governing the clear or stop indication of a signal from a control office, manually operable means at the control office for designating the desired normal or reverse position of said track switch, a magnetic stick switch control relay in the field for governing the power operation of said track switch, a polarized control circuit for the control of said magnetic stick relay in accordance with the switch position designated by said manually operable means at the control office, said circuit including a pair of control wires extending from the control office to the field, a signal indication relay at the control office, a signal indication circuit for selectively energizing said signal indication relay in correspondence with the condition of said signal, said signal indication circuit including said pair of wires, and electro-responsive means at the control office for selecting the inclusion of said pair of control wires in said polarized circuit or said signal indication circuit, said electro-responsive means being energized to effect the shifting of the connection of one of said wires from said polar switch control circuit to said signal indication relay in response to the energization of said signal indication relay upon the designation of said signal to be cleared, provided that said polarized circuit has been last closed and energized with a polarity in correspondence with the polarity required for the power operation of said track switch to the switch position designated at the control office, said electro-responsive means being effective irrespective of the actual position of said track switch.

7. The combination with respective polarized switch and signal control circuits extending between a control office and the field and manually operable contact means for manual designation of the respective desired positioins to which a power track switch is to be operated and the respective desired clear or stop indication of a signal, of a neutral signal indication control relay for said signal, a pick-up circuit for said signal indication control relay closed when a signal is designated to be cleared, only provided that said switch control circuit has been last closed and energized with a polarity in correspondence with the polarity required for operation of said track switch to the switch position last designated, a first stick circuit for maintaining said signal indication control relay energized as long as said manually operable contact means is actuated to a position for designation for said signal to be cleared, irrespective of the selections of said pick-up circuit, and a second stick circuit for maintaining said signal indication control relay energized as long as said signal is cleared, irrespective of the contact selections of said pickup circuit or said first stick circuit.

8. In a switch and signal control system for governing from a control office the establishment of each of a plurality of routes through a track layout comprising a plurality of crossovers and signals for governing traffic over the routes, manually operable means for designating the desired positions of the track switches of the respective crossovers and for designating the desired clear or stop aspects of the respective signals, electro-responsive means at the control office and in the field for each of the crossovers distinctively responsive to its polarity of energization, a lock relay for each crossover, a polarized control circuit for energizing said electro-responsive means including a contact of said lock relay, said polarized control circuit having its polarity of energization determined by said manually operable means, a signal control circuit network at the control office comprising circuit portions comparable to the respective routes through said track layout, the circuit portion for each of said routes including circuit means for energizing said signal control relay for the signal governing entrance to that route in accordance with the manual actuation of said manually operable means for the associated signal, said circuit network including, contacts in the circuit portion for each route checking the last polarity of energization of said electro-responsive means at the control office for each crossover having a track switch included in that route in correspondence with the position of the track switches of the crossover that are designated by said manually operable means, irrespective of the actual position of said track switch, and circuit means for actuating said lock relay to open the switch control circuit for governing the track switches of the associated crossover in response to the clearing of a signal governing entrance to a route including a track switch of the associated crossover.

9. In a switch and signal control system affording a plurality of routes, the combination with respective polarized switch and signal control circuits extending between a control office and the field selectively energized in response to the actuation of manually operable contact means, of a signal control relay for each signal for governing the energization of each of said signal control circuits, a signal control circuit network comprising circuit portions comparable to the respective routes through said track layout, the portion for each of said routes including circuit means for energizing said signal control relay for the signal governing entrance to that route, said circuit means including contacts checking the last polarity of energization of said switch control circuit for each track switch included in that route in correspondence with the position of that track switch designated by said manually operable means, irrespective of the actual position of said track switch, and stick circuit means for maintaining each of said signal control relays picked up, dependent upon said manually operable means for that signal, irrespective of said circuit network.

10. In a switch and signal control system for governing from a control office the establishment of each of a plurality of routes through a track layout affording by crossovers optional routes between given route ends, signals for governing entrance to said routes for opposite directions of traffic, manually operable means at the control office for each crossover for designating the positions of the track switches of that crossover and for designating the desired clear or stop indication of each of said signals, a switch control circuit for operating each of said track switches in response to the positioning of said manually operable means for each of said crossovers, a signal control relay for each of said signals, and a signal control circuit network for the energization of each of said signal control relays having circuit portions comparable to the respective routes of said track layout, each of said portions comprising circuit selections associated with the track switches included in such portions to check that the positions of those track switches have been properly designated to align that route before said signal control relay for the signal governing entrance to that route can be energized, said circuit network including circuit selections to allow the energization of the signal control relay governing entrance to one of said optional routes for one direction of traffic subsequent to the designation of that signal to be cleared, but said circuit network including circuit selections preventing the energization of the signal control relay for governing entrance to said one route from the opposite direction, and thus allowing the clearing of that signal only when the other of said optional routes is established.

GEORGE J. JOHANEK.
THOMAS J. JUDGE.

References Cited in the file of this patent

UNITED STATES PATENTS

| Number | Name | Date |
|---|---|---|
| 1,969,053 | Wight | Aug. 7, 1934 |
| 2,019,467 | Wenholz | Oct. 29, 1935 |
| 2,090,916 | Preston | Aug. 24, 1937 |